United States Patent [19]

Owens et al.

[11] Patent Number: 5,441,799

[45] Date of Patent: Aug. 15, 1995

[54] POROUS SILICON CARBIDE

[75] Inventors: Dean P. Owens, Tonawanda; Irving B. Ruppel, Kenmore, both of N.Y.

[73] Assignee: The Carborundum Company, Niagara Falls, N.Y.

[21] Appl. No.: 177,642

[22] Filed: Jan. 4, 1994

Related U.S. Application Data

[63] Continuation of Ser. No. 898,122, Jun. 12, 1992, abandoned.

[51] Int. Cl.$^6$ ............................................. C04B 35/56
[52] U.S. Cl. ................................. 428/312.6; 277/96; 277/96.2; 277/DIG. 6; 428/212; 428/312.2; 428/446; 428/698; 428/704; 423/345; 501/88; 501/90
[58] Field of Search .............. 501/90, 88; 423/345; 277/96, 96.2, DIG. 6; 428/312.6, 312.2, 212, 446, 698, 704

[56] References Cited

U.S. PATENT DOCUMENTS

| | | | |
|---|---|---|---|
| 3,951,587 | 4/1976 | Alliegro et al. | 432/258 |
| 4,004,934 | 1/1977 | Prochazka | 501/90 |
| 4,179,299 | 12/1979 | Coppola et al. | 106/44 |
| 4,295,890 | 10/1981 | Stroke | 501/90 |
| 4,312,954 | 1/1982 | Coppola et al. | 501/90 |
| 4,525,461 | 6/1985 | Boecker et al. | 501/90 |
| 4,690,909 | 9/1987 | Okuno et al. | 501/90 |
| 4,737,327 | 4/1988 | Hatta et al. | 264/60 |
| 4,957,811 | 9/1990 | Benker et al. | 428/312.6 |
| 4,990,469 | 2/1991 | Dussaulx et al. | 501/90 |
| 5,080,378 | 1/1992 | Kagawa | 277/96 |
| 5,094,985 | 3/1992 | Kijima et al. | 501/88 |

OTHER PUBLICATIONS

Knoch et al., "SiC As Tribological Material—Development and Production of Sintered Silicon Carbide for Tribological Applications", Tribolgie, pp. 230-243 (Koblenz 1991).

Niester, T., "Tribologisches Verhalten von nichtoxidischen Keramiken unter praxisnahen Bedingungen", VDI-Verlag GmbH (Dusseldorf 1992).

Seshadri, et al., Ceramic Transactions, Silicon Carbide '87, vol. 2, pp. 215-226.

Lashway, et al., Lubrication Engineering, Jun. 1984, vol. 40, pp. 356-363.

*Primary Examiner*—A. A. Turner

[57] ABSTRACT

Silicon carbide sintered bodies having controlled porosity in the range of about 3-25 vol % are prepared from raw batches containing a multimodal distribution of silicon carbide particles and comprised of at least a first set of particles having one average grain size and a second set of particles having another average grain size larger than the first set of particles. The resulting pores are 3-5 microns in the largest dimension, with an aspect ratio between about 1/1 and about 3/1. The porous bodies, e.g., in the form of mechanical seal members, exhibit good tribological properties.

10 Claims, 3 Drawing Sheets

POROUS SILICON CARBIDE

This is a continuation of application Ser. No. 07/898,122 filed on Jun. 12, 1992 now abandoned.

This invention is in the field of ceramic materials and processes. More specifically, this invention is directed to a sintered silicon carbide body which includes a controlled porous phase, as well as to the raw batch from which the ceramic body is produced, the process by which the raw batch is converted to the finished ceramic body, and a mechanical seal member made from the sintered silicon carbide.

BACKGROUND

A number of the applications for silicon carbide depend upon the friction and wear (tribological) characteristics of the material, in addition to its outstanding thermal, chemical and mechanical properties. These applications include, for example, mechanical seal faces, valve lifters and nozzles. Mechanical seal applications are especially demanding in that the seal members are subjected to both a large compressive force (P) normal to the surface of the face and a sliding velocity (V) across the surface of the face. In evaluating the performance of mechanical seal members, the product (PV) under which the seal can operate is an important parameter.

Certain materials, such as boron nitride, graphite, fluorocarbons and silicones, are self-lubricating, but silicon carbide itself is not one of these. Consequently, mechanical seals which employ silicon carbide as one or both of the seal members may exhibit a squeaking sound when the faces are engaged, or excessive force may be required to initiate separation of the faces and opening of the seal. These behaviors are not desirable, and attempts have been made to introduce lubrication at the seal face surfaces to eliminate these problems. The very liquid upon which the seal operates can be called upon to perform this lubricant role.

The use of various forms of silicon carbide in mechanical seal applications has been described by Lashway in Lubrication Engineering, 40, 356 (1984). Among the forms of silicon carbide tested by Lashway was a sintered silicon carbide containing "controlled porosity"; the manner in which it was produced was not disclosed. The pores in this silicon carbide, comprising 8–10 volume percent ("vol %" hereinafter) of the body, were said to be closed and small, i.e., 20 microns. For purposes of this application, vol % porosity = 100 − 100 × [observed density/theoretical density]. Lashway attributed the superior mechanical seal face performance of his porous silicon carbide to its ability to retain a hydrodynamic film of the sealed liquid on the seal face.

Silicon carbide of theoretical density (3.21 g/cm$^3$) is seldom seen in commercial applications, and the silicon carbide of lesser density which is used generally contains a second, pore phase. These pores may be void or filled with silicon or some other material, depending upon the processing route and desired properties. Porosity of a few vol % is not a factor in many silicon carbide applications and is generally ignored. U.S. Pat. Nos. 4,179,299 and 4,312,954 describe silicon carbide of less than theoretical density, and the silicon carbide disclosed therein can be found in many commercial mechanical seal applications. A more recent patent, U.S. Pat. No. 4,525,461, discloses a sintered silicon carbide which also contains graphite. This graphitized silicon carbide, which is said to be self-lubricating and useful in mechanical seal applications, also contains pores. Thus, silicon carbide sintered bodies which contain pores are not per se new.

The presence of pores in silicon carbide can be detrimental to its performance to the extent physical properties of the sintered body affect its performance. In this regard, Seshadri, et al., Ceramic Trans., 2, 215 (1987), reported preparing sintered silicon carbide bodies with a series of porosities in the range 1–7.5 vol % by altering the sintering parameters and carbon additions. The flexural strength of the resultant sintered silicon carbide bodies was reported to be insensitive to the porosity up to a porosity of 7 vol %, but the elastic constants and fracture toughness were affected significantly.

Introducing porosity into a sintered silicon carbide body by variations in the sintering time/temperature profile has not been reproducible enough to enable this technique to be used for making commercial porous material. Hence, such materials do not exhibit the "controlled" porosity referred to hereinafter. Another method that can produce porous sintered silicon carbide, involves reduction in the amount of sintering aids. This method decreases densification, and a porous body with lower density is produced. Control over this process is the major deterrent. Precise control of the raw materials is necessary to make this method dependable. This is not possible with today's materials at reasonable cost, thus making the processing window for this method very small, and hard to predict.

Porous sintered materials can also be produced by adding other materials that thermally degrade and/or shrink, such as cellulose, plant products of many types and shapes/sizes, and inorganic materials such as glass or low temperature ceramics. These materials, may, however, present difficulties in mixing with the fine silicon carbide powder and, further, may interfere with the sintering mechanism.

Consistent with Lashway's 1983 report, it was disclosed in German Offen. DE 3927300, laid open Feb. 2, 1990, that sintered silicon carbide bodies having between 4 vol % and 13 vol % porosity, where the pores averaged between 10 microns and 40 microns in diameter, provided superior mechanical seals. Such porous bodies were prepared by introducing spherical organic polymeric beads into the raw batch from which the green bodies were produced and then heating the green bodies to remove the organic and densify the body. It was observed that, at pore volumes less than 4 vol %, the porosity was insufficient to effect the improvement, while at pore volumes greater than 13 vol %, the strength of the body was adversely affected, and the pores intercommunicated, causing leakage of the seal. Further, if the average pore diameter was less than 10 microns, the lubricating liquid in the pores was not sufficiently available, while at pore diameters greater than 40 microns, carbon seal face wear was accelerated and seal leakage occurred. It was said that the pores must be rounded in order to avoid stress concentration in the sintered body.

Whereas the introduction of porosity into a sintered silicon carbide body can be effected by introducing organic polymer beads into the raw batch, that technique is not without disadvantages. For example, the polymer must be homogeneously dispersed in the green ceramic body and then be removed from the ceramic body if pores are to be created. Presumably this occurs by thermal decomposition of the polymer beads in the sintering step. However, it is difficult for the resultant products of decomposition to leave the pores if they are truly independent; the interior pores probably communicate with other pores closer to the surface of the body. To the extent the decomposition products remain in the sintered body they constitute contaminants which can affect the physical properties of the ceramic body. Furthermore, the somewhat elastic polymer beads can be compressed under the pressure utilized in forming the green ceramic body; release of the pressure with recovery of the beads can introduce microcracks in the surrounding silicon carbide matrix. In addition, the use of polymer beads can add additional manipulative steps and materials expense which may be reflected in the price of the product.

SUMMARY OF THE INVENTION

Thus, there is needed an alternative method for introducing a controlled amount of porosity into a sintered silicon carbide body, without the added expense and other problems that introduction of organic polymer beads causes. Consequently, this invention has as one object providing a sintered silicon carbide body having controlled porosity. The term "controlled porosity" as used herein is meant to include pores which can be reproducibly introduced and uniformly distributed throughout the ceramic body.

It is another objective of this invention to provide a raw batch from which the sintered silicon carbide body with controlled porosity can be produced. It is yet another objective to provide a method for making a sintered silicon carbide body with controlled porosity which does not introduce foreign components and which does not add appreciably to the cost of the product. In addition, it is an objective to provide a mechanical seal member made from said porous, sintered silicon carbide. Other objectives will become apparent hereinafter.

Consequently, this invention provides, in one aspect, a silicon carbide sintered body having porosity in the range of about 3–25 vol %, the pores therein being uniformly distributed throughout the body and of generally irregular shape, about 3–5 microns in the longest dimension, with an aspect ratio between about 1/1 and 3/1, generally about 2/1. According to the invention, the silicon carbide grains exhibit a multimodal, e.g., bimodal, particle size distribution and are comprised of at least a first set of particles having one average grain size, i.e. diameter, and a second set of particles having another average grain size which is larger than the first set of particles, the weight ratio of the first set to the second set lying in the range of about 25/75 to about 75/25.

In another aspect, this invention provides a raw batch for preparing the aforesaid silicon carbide sintered body, said raw batch comprising about 75 wt % to about 99 wt % silicon carbide having a multimodal particle size distribution as described above; about 0.15 wt % to about 5 wt % boron source; about 0.38 wt % to about 20 wt % carbon source; and about 0.5 wt % to about 15 wt % binder.

In further aspects, the invention provides a process for producing the aforesaid silicon carbide sintered body from the raw batch, as well as a sintered ceramic body in the form of a mechanical seal member.

This invention, including the manner and means by which it can be carried out, will be clarified by reference to the drawings which accompany this specification and to the detailed description which follows.

DETAILED DESCRIPTION

Figure 1:
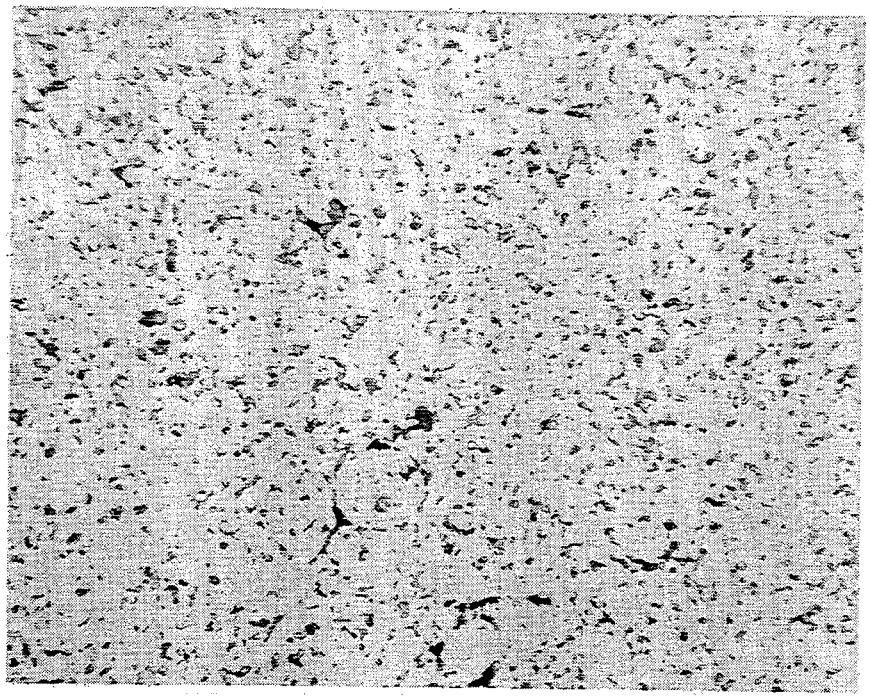
FIG. 1 is a photomicrograph at 500X of an unetched, sectioned silicon carbide sintered body produced in accordance with Example 1 hereinafter.

The practice of this invention does not depend upon the specific nature of the silicon carbide starting material. According to the invention, porous, sintered ceramic bodies having densities in excess of about 2.4 g/cm$^3$, corresponding to at least about 75% of the theoretical density of silicon carbide, i.e., with no more than about 25 vol % pores, are readily produced and generally required to avoid seriously affecting the mechanical properties of the sintered body. Although by no means necessary, it is preferred that the silicon carbide be the alpha, non-cubic crystalline form, since the alpha form is less expensive and more readily obtained than the beta, cubic crystalline form. However, the beta form, or mixtures of alpha and beta crystalline material, can be employed, as can amorphous, non-crystalline silicon carbide powder, provided the average grain size meets the requirements hereinafter specified. The process used to make the sintered bodies of this invention does not cause any substantial amount of phase transformation, so the crystalline habit of the silicon carbide starting material will be substantially retained in the finished sintered ceramic body.

The silicon carbide starting material can be obtained from any of a variety of sources. Vapor phase reacted material is produced in fine particle size and can be used if desired. Larger material can be ball milled or otherwise reduced in size until sufficient amounts of fine silicon carbide are obtained, and the proper size of silicon carbide can be selected from the ball milled product by conventional means, such as water sedimentation, screening, etc. Mechanically reducing the size of larger material is a preferred way to prepare silicon carbide useful in this invention. In any event, it is preferred that the silicon carbide material shall have been treated with acid (such as hydrofluoric and/or nitric acids, particularly mixtures of hydrofluoric and nitric acids) to remove extraneous materials which may interfere with the sintering operation.

As noted, the minimum density for sintered ceramic bodies according to the invention is about 2.4 g/cm$^3$ (porosity about 25 vol %), but a sintered density of at least about 2.8 g/cm$^3$, corresponding to no more than about 13 vol % pores, is preferred. The minimum porosity required in order to substantially affect the tribological properties of the sintered body appears to be about 3 vol %, preferably about 10 vol % to about 12 vol %. Such bodies can be used "as is" for applications such as mechanical seal faces, or they can be machined to the desired size and shape at a lower density and later subjected to further firing to produce additional densification.

The sintered ceramic body in accordance with the present invention contains from about 91 wt % to about 99 wt % silicon carbide, the silicon carbide being a blend of at least two silicon carbides of different average grain size, the number of individual grains of a given size exhibiting a normal bell-shaped distribution about the average. The sintered body further includes from about 0.5 wt % to about 5.0 wt % carbon, from about 0.15 wt % to about 3.0 wt % boron, and up to about 1.0 wt % additional carbon, i.e., carbon chemically associated with the boron, e.g., boron as boron carbide. All weight percentages (wt %) herein are specified with respect to the total weight of the body or batch, unless otherwise specified. Within this broad composition, it is preferred that the sintered ceramic body contain from about 0.5 wt % to about 4 wt % carbon, e.g., from carbonized organic material, from about 0.2 wt % to about 0.4 wt % boron as boron carbide, and about 0.05 wt % to about 0.11 wt % additional carbon associated chemically with the boron, with the balance of the composition being silicon carbide. Most preferably, the sintered ceramic body contains about 98 to about 99 wt % silicon carbide, about 1 to about 1.5 wt % carbonized organic material, about 0.25 to about 0.36 wt % boron as boron carbide, and about 0.07 wt % to about 0.10 wt % additional carbon chemically associated with the boron.

The sintered ceramic body should contain from about 0.15 wt % to about 3.0 wt % boron, preferably about 0.2 wt % to about 0.4 wt %, most preferably about 0.25 wt % to about 0.36 wt %. In so specifying the boron content, it is not intended to limit the form in which the boron may be present, i.e., whether elemental boron or combined in boron compounds such as boron carbide. Indeed, in most cases the boron will be present as a compound of boron, such as boron carbide, in the finished sintered ceramic body. The "additional carbon,-" i.e., the carbon chemically associated with the boron and broadly specified as being present in an amount up to about 1.0 wt %, is thus an optional component of the finished sintered ceramic body, as the amount of such additional carbon, i.e., carbon other than that of the silicon carbide or that which is present as carbonized organic material, will depend on the carbon associated with the boron which was present in the raw batch mixture from which the sintered ceramic body was made.

The amount of carbon which is present as carbonized organic material will depend on the amount of such organic material which was added to the raw batch and the char yield (carbon content) of the organic material. The raw batch for producing the sintered ceramic body in accordance with the invention comprises about 75 wt % to about 99 wt %, preferably about 94 wt % to about 96 wt %, silicon carbide composed of at least two different silicon carbides which differ in average particle size. In addition, it is preferred that none of the silicon carbides have an average grain size larger than about 15 microns, and it is especially desirable if one of the silicon carbides has an average grain size less than about 1 micron. It has been noted that increasing the relative amount of the larger sized silicon carbide, at the expense of the smaller sized silicon carbide, leads to a lower density in the sintered ceramic body and a corresponding increase in its porosity. Although the weight ratio of the larger sized silicon carbide to the smaller sized silicon carbide can vary over a wide range, it is preferred that the ratio lie in the range between about 25/75 and about 75/25, a ratio of about 50/50 being especially attractive.

One of the important features of the raw batch of the present invention is the carbonizable organic material or carbon source. The organic material can be soluble in organic solvents, but is preferred that it be soluble in water for safety and environmental reasons. In any case, it is important that it be easily dispersed to coat the silicon carbide particles, thereby increasing the availability of the carbonized organic material upon firing the shaped body produced from the raw batch. It has been found desirable that the sintered ceramic body contain from about 0.5 wt % to about 5.0 wt % of carbonized organic material, with the result that, if the carbonizable organic material has a char yield of from about 25 wt % to about 75 wt %, as is preferred, there should be present from about 0.38 wt % to about 20 wt % carbonizable organic material in the raw batch. Within the range of from about 25 wt % to about 75 wt % char yield, it is preferred that the organic material have from about 33 wt % to about 50 wt %, more particularly from about 40 wt % to about 45 wt %, char yield. If the char yield is between about 33 wt % and about 50 wt %, the amount of carbonizable organic material in the raw batch should range between about 1.5 wt % and about 10 wt % to produce the preferred 0.5 wt % to about 5.0 wt % carbon in the finished sintered ceramic body. The most preferred amount of carbonized organic material in the sintered ceramic body is believed to be about 1 wt % to about 1.5 wt %, so that the optimum raw batch should contain about 2 wt % to about 4 wt % of carbonizable organic material, preferably soluble in water and having a char yield between about 40 wt % and 45 wt %.

Carbonizable organic materials are represented by phenolic resins and coal tar pitch, which have char yields of about 40 wt % to about 42 wt % and on the order of 60 wt %, respectively. As between phenolic resins and coal tar pitch, the phenolic resins are preferred, and B-stage phenolic resole resins, such as Resin No. 8121, available from Varcum Chemical Co., are particularly useful in this invention. Of greater utility, however, are phenol-formaldehyde resins, which in some instances are water soluble. An example is the "Plyophen 43290 Liquid One Step Phenolic Resin" available from Oxidental Chemical Co.

The boron can be added to the raw batch as elemental boron or as a boron-containing compound, e.g., boron carbide. Boron carbide is essentially a non-stoichiometric material, and various boron carbides having a molar ratio of boron to carbon between about 8:1 and 2:1 have been reported. It is, in general, preferred to use boron carbide as the boron source and, in particular, boron carbide which is so called "solid state reacted boron carbide," with a molar ratio of boron to carbon between about 3.5/1 and about 4.1/1. Such boron carbide can be produced in accordance with the process of U.S. Pat. No. 3,379,647. Boron carbides having higher ratios of boron to carbon are more chemically reactive than the material having a ratio of about 3.5/1 to about 4.1/1 but are less available, more expensive, and therefore not preferred.

The amount of boron source to be added to the raw batch depends on the boron content of the boron source and the amount of boron desired in the final sintered ceramic body. The sintered ceramic body should contain from about 0.15 wt % to about 3.0 wt % boron, and in particular from about 0.2 wt % to about 0.4 wt % boron is present in the preferred ceramic bodies produced in accordance with the present invention. The optimum boron content of the sintered ceramic body is about 0.25 wt % to about 0.36 wt %. The amount of boron source should be chosen accordingly. Thus, if the boron source is elemental boron, it should optimally be present in the raw batch in an amount to yield a sintered ceramic body having from about 0.25 wt % to about 0.36 wt % boron. For the preferred solid state reacted boron carbide, with a molar ratio of boron to carbon between about 3.5:1 and about 4.1:1, the boron carbide should be present in the raw batch in an amount from about 0.2 wt % to about 4 wt % to produce such an amount of boron in the finished sintered ceramic body.

The boron source can be crystalline or amorphous and preferably is powder of an average grain size less than about 30 microns. Within this limitation, it is preferred that the particle size be in the range from about 0.1 micron to about 10 microns.

The temporary binder can be selected from a wide range of organic resins and other materials well known to those skilled in the art, such as polyvinyl alcohol, acrylic resins, coal tar pitch, long chain fatty material (for example "CARBOWAX"), metallic stearates, such as aluminum stearates and zinc stearates, sugars, starches, alginates, and polystyrene. Many of these materials are, of course, capable of functioning as a carbonizable organic material which is added to yield at least some of the carbon in the sintered body. Thus, a single material can serve two functions in the raw batch. The temporary binder should comprise between about 0.5 wt % and about 15 wt % of the raw batch, depending upon the char yield, for example.

The binder preferably includes polyvinyl alcohol having associated therewith from about 5 to about 15 parts by weight water per part of polyvinyl alcohol, as a temporary binder vehicle. In particular, it is preferred to use about 10 parts by weight polyvinyl alcohol plus about 90 parts by weight water as a temporary binder vehicle. In addition, the aqueous polyvinyl alcohol may have associated therewith an acrylic resin, such as "RHOPLEX® HA-8 Emulsion, " available from Rohm & Haas Company. The raw batch preferably contains from about 1 wt % to about 2 wt % each of aqueous polyvinyl alcohol and aqueous acrylic resin, the binder preferably comprising between about 2 wt % and about 3 wt % of the raw batch.

The process for producing the sintered ceramic body according to another aspect of the invention begins by mixing together the components of the raw batch to contain from about 75 wt % to about 99 wt % silicon carbide; between about 0.38 wt % and about 20 wt % of the carbonizable organic material; from about 0.15 wt % to about 5 wt % of the boron source; and from about 0.5 wt % to about 15 wt % temporary binder. If the temporary binder includes aqueous polyvinyl alcohol, the first mixing step preferably includes stirring the powdered components, silicon carbide, carbonizable organic material and boron source, together with the temporary binder, prior to optionally adding a solvent in which the carbonizable material is soluble. In any event, after the solvent is added, the raw batch should be stirred for 5 to 15 minutes to coat the carbonizable organic material onto the silicon carbide particles of the raw batch. After the raw batch has been sufficiently stirred, the stirred mixture is dried by one of the techniques known in the art, such as passing a quantity of dry gas over the stirred mixture or by spray-drying the mixture, yielding a flowable powder.

Following this drying step, the dried mixture can be formed to produce a shaped body, preferably having a density of at least about 1.60 g/cm$^3$ For example, the mixture can be formed into mechanical ring seal faces if desired. This can be accomplished by any of a variety of techniques which are known to those skilled in the art. For example, the mixture can be shaped by extrusion, injection molding, transfer molding, casting, cold pressing, isostatic pressing, or by compression. If compression is used, preferred pressures are between about 4,000 and about 100,000 psi, with between about 16,000 and about 20,000 psi, e.g., about 17,000 psi at room temperature, being preferred.

If the temporary binder requires curing, e.g., if the binder contains polyvinyl alcohol, the next step, curing the temporary binder, can be accomplished by heating the shaped body at a temperature of about 90° C. to about 100° C. for about 1 to about 2 hours. Other curing conditions, known to those skilled in the art, may be required for other binders. The shaped body is then fired to carbonize the organic material and accomplish the densification necessary to produce the porous sintered ceramic body of the invention. Firing requires heating the formed body for about 20 to about 60 minutes at temperatures between about 1900° C. and about 2500° C. The use of lower temperatures is generally to be avoided, since at lower temperatures densification of the body may not be reproducible, and controlled porosity may not be achieved. At higher temperatures sublimation of the silicon carbide can occur.

The firing step can be carried out in a conventional batch or continuous furnace, wherein the shaped body is passed through the hot zone of the furnace at a rate to provide a prescribed residence time at the desired temperature and for the desired time. Details of such furnaces are known in the art, and are described, for example, in U.S. Pat. No. 3,689,220. The firing step accomplishes a "pressureless sintering," referred to herein for simplicity merely as "sintering" By "sintering" or "pressureless sintering" is meant that no mechanical pressure is applied to the object being fired or sintered to promote densification. Instead, the object being sintered, usually in an inert container such as a graphite crucible, is maintained under an atmosphere of inert gas, a reducing gas, a vacuum, or nitrogen. Reducing gases include hydrogen, carbon dioxide and carbon monoxide; inert gases include argon, helium, and neon. The gases in which the sintering operation can be carried out thus include argon, carbon dioxide, carbon monoxide, helium, hydrogen, neon and nitrogen or mixtures thereof. Although nitrogen, under sintering conditions, enters into reaction to some degree with the silicon carbide, it does so in sufficiently minor degree that the composition of the sintered ceramic body is not noticeably changed thereby. The use of nitrogen does, however, raise the sintering temperature, so that if nitrogen is the surrounding atmosphere, the preferred sintering temperature is between about 2260° and about 2300° C. Under the other gases, particularly inert gases such as argon, helium or neon, the preferred sintering temperature is between about 2060° and about 2200°C. The firing can also be carried out under vacuum. By "vacuum" is meant a practical vacuum, i.e., about 1.0 torr or less.

The following specific Examples illustrate the practice of the several aspects of this invention.

EXAMPLE 1

Figure 2:
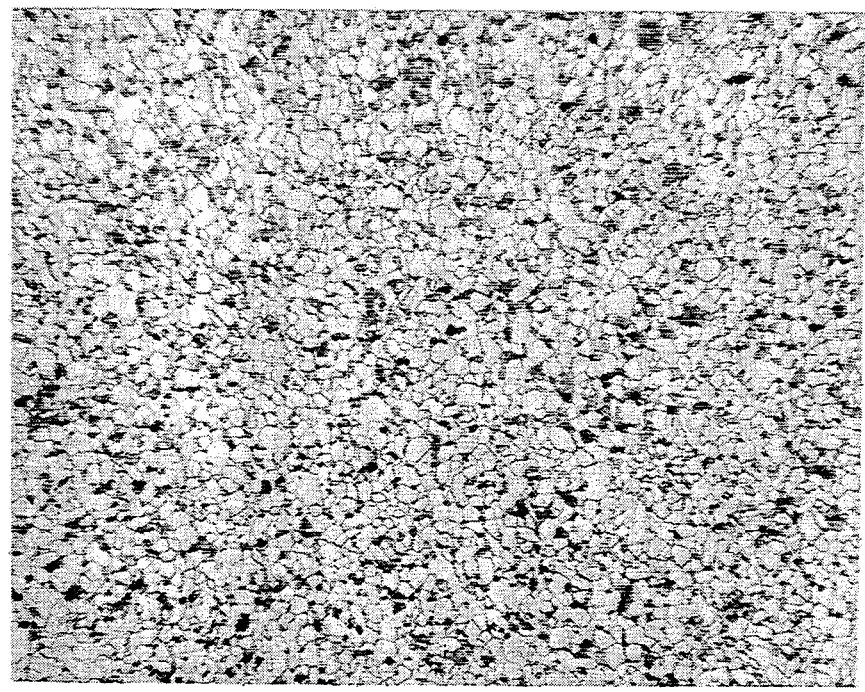
FIG. 2 is a photomicrograph at 500X of the same sample shown in FIG. 1, except that the silicon carbide has been etched.

Silicon Carbide (47.525 g, alpha powder having an average grain size of 0.5 micron) is blended with silicon carbide (47.525 g, alpha powder having an average grain size of 3.0 microns) and with 0.35 g boron carbide (solid state reacted), 2.4 g carbon source (PLYOPHEN 43290 resin from OxyChem having a char yield of 42.5%) and a binder consisting of 1.2 g of 18 wt % polyvinyl alcohol in water and 1.0 wt % acrylic resin (RHOPLEX ®)HA-8 Emulsion from Rohm & Haas). The char yield of the binder is zero under the sintering conditions employed. Water is added to form a slurry, which is then spray dried to form a free flowing powder. The resultant powder is formed into a compact at a pressure of about 17.0 Ksi and sintered at 2150° C. under an argon atmosphere. The sintered silicon carbide body produced thereby has a density of 2.95 g/cm$^3$, [2.95/3.21]×100=92% of the theoretical density of silicon carbide, implying a pore volume of 8%. Microscopic analysis of the surface of the sectioned sintered body indicates 12.6 % of the surface area comprises pores, the average pore being 3.6 microns long and 2.3 microns wide, with an average pore area of 8.1 micron$^2$ Representative photomicrographs of the sectioned sintered body appear as FIGS. 1 and 2, the unetched body (FIG. 1) showing most clearly the generally irregular shape of the pores, the etched body (FIG. 2) showing the silicon carbide grain. The following physical properties of the sintered body are determined:

| Modulus of rupture | 45.8 Ksi |
| --- | --- |
| Weibull modulus @ $\sigma$ = 2.7 | 17 |
| Fracture toughness | 4.3 Ksi/in$^{\frac{1}{2}}$ |
| Modulus of elasticity | 56.2 Mpsi |
| Knoop hardness | 3272 Kg/mm$^2$ |

EXAMPLE 2

Figure 3:
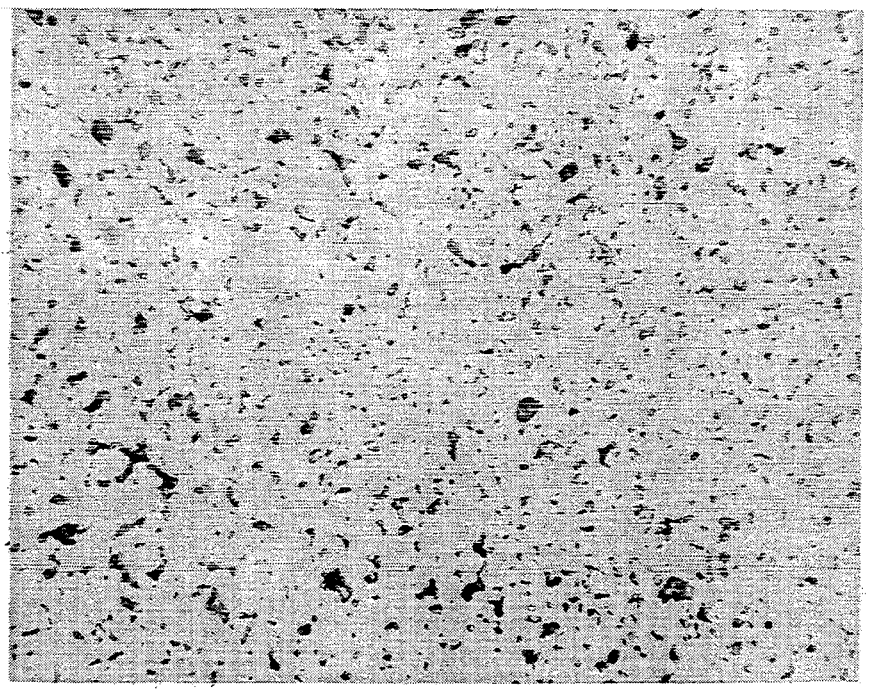
FIG. 3 is a photomicrograph at 500X of an unetched, sectioned silicon carbide sintered body produced in accordance with Example 2 hereinafter.

Silicon carbide (61.126 g alpha powder having an average grain size of 0.5 micron) is blended with 32.914 g alpha silicon carbide powder having an average grain size of 3.0 microns and with 0.46 g boron carbide (solid state reacted), 2.7 g carbon source comprising the same phenolic resin described in Example 1, and a binder consisting of 1.5 g of the PVA solution and 1.3 g of the acrylic resin as described in Example 1. Water is then added to form a slurry which is spray dried, producing a free flowing powder. A compact is formed from the powder under about 17.0 Ksi pressure, and the green body is sintered as in Example 1, yielding a sintered silicon carbide body having a density of 3.05 g/cm$^3$, 95% of theoretical density for silicon carbide, with a calculated pore volume of 5%. Microscopic analysis of the sectioned, sintered body yielded 9.4 area % pores, the average pore being 2.8 microns long, 1.8 microns wide and having a total area of 5.0 micron$^2$. A representative photomicrograph of the sectioned sintered body appears as FIG. 3.

EXAMPLE 3

Figure 4:
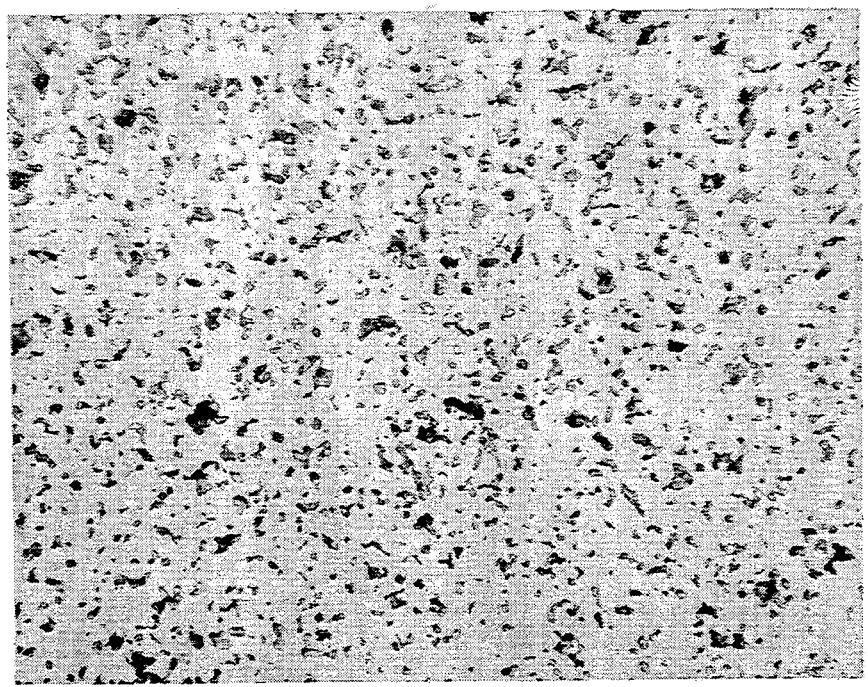
FIG. 4 is a photomicrograph at 500X of an unetched, sectioned silicon carbide sintered body produced in accordance with Example 3 hereinafter.

Example 1 is repeated, except that the weight ratio of the silicon carbide with average grain size of 0.5 micron to the silicon carbide of 3.0 microns average grain size is 35/65. This composition yields a sintered silicon carbide body with a density of 2.80 g/cm$^3$, 87% of the theoretical density of silicon carbide, and a calculated pore volume of 13%. Microscopic examination of the sectioned sintered body shows 18.0 area % pores with the average pore dimension being 4–5 microns. A representative photomicrograph of the sectioned sintered body appears as FIG. 4.

EXAMPLE 4

Figure 5:
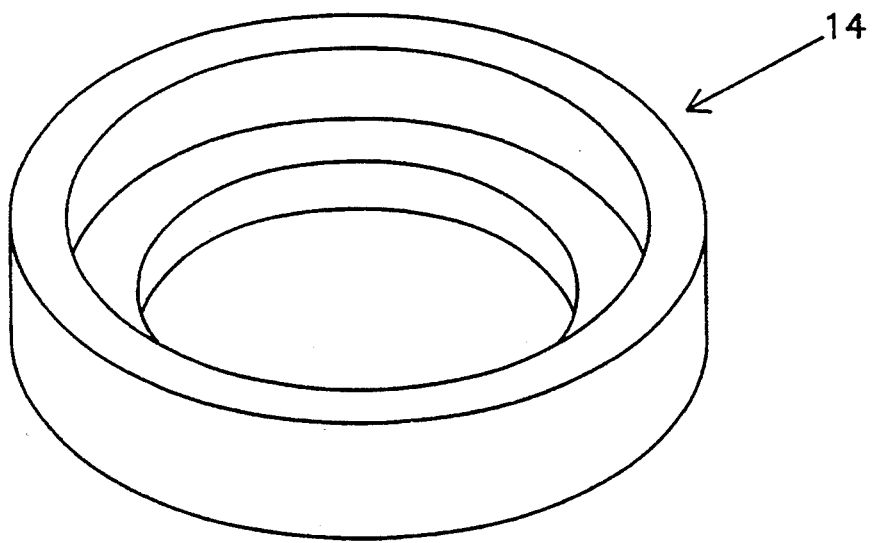
FIG. 5 is a view in perspective showing a mechanical seal member within the scope of this invention.
Figure 6:
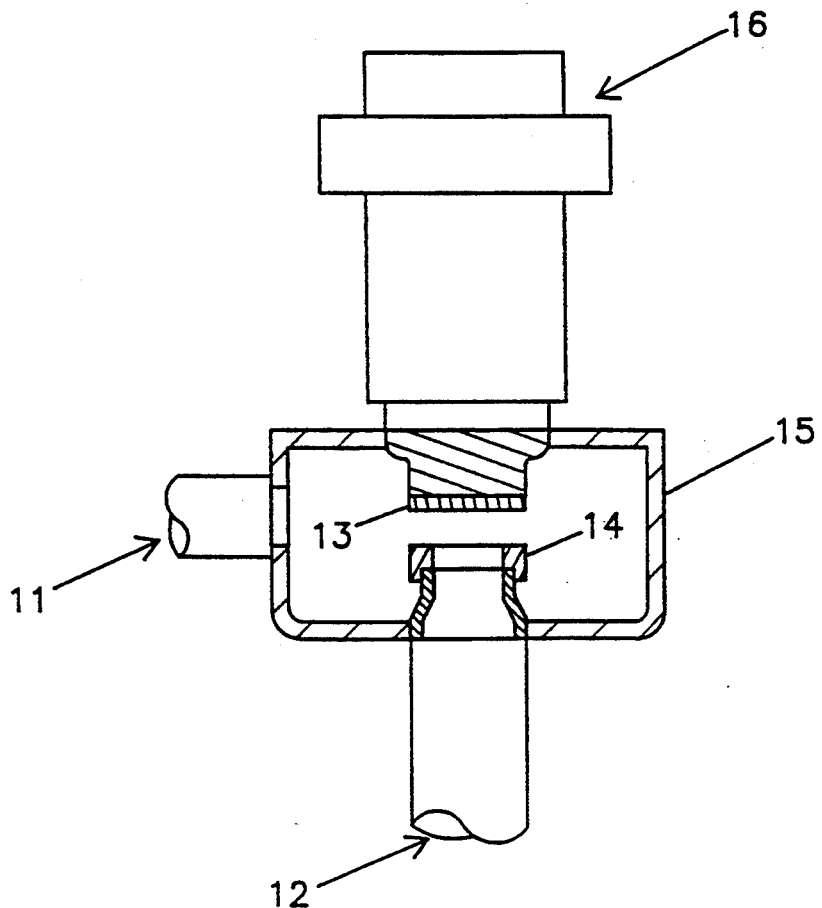
FIG. 6 is an elevational view, partially in section, showing a mechanical seal member of this invention as it may be used in a mechanical seal application.

Utilizing the raw batch described in Ex. 1, adding solvent to dissolve the phenolic resin, stirring, and then drying the stirred mixture, a mechanical seal member green body is formed in a mold under 17 Ksi compression, with dimensional allowances for shrinkage, and the green body is heated to about 100° C. for 1.5 hours to cure the binder. The green body is then sintered under argon at 2100° C. for 40 min. The finished mechanical seal member is illustrated in FIG. 5, and its use is shown in FIG. 6. With reference now to FIG. 6, which shows a valve with a portion thereof broken away, liquid enters the valve at 12, passes into housing 15, and exits at 11. The mechanical seal members 13 and 14, which are shown disengaged, permitting the liquid to flow, are engaged face to face by rotating screw handle 16, bringing seal member 13 down upon seal member 14 to close off the liquid flow. Either or both of seal members 13 and 14 will be porous silicon carbide within the scope of this invention. Evaluation of the seal members in sealing applications demonstrates that seal members within the scope of this invention are effective in such applications.

It will be evident that this invention can be carried out in ways other than the ways illustrated in the aforesaid specific Examples. Accordingly, the scope of this invention is not to be limited to those specific Examples but is to be accorded the full scope represented in the following claims.

What is claimed is:

1. A mechanical seal member comprising about 91 wt. % to about 99 wt. % sintered silicon carbide having a porosity in the range of about 3 vol. % to about 25 vol. %, the pores therein being uniformly distributed throughout the body and of generally irregular shape, about 3–5 microns in the largest dimension, with an aspect ratio between about 1/1 and 3/1, the silicon carbide particles exhibiting a multimodal grain size distribution and comprised of at least a first set of particles having one average grain size and a second set of particles having another average grain size larger than the first set of particles, the weight ratio of the first set to the second set lying in the range of about 25/25 to about 75/25.

2. The seal member of claim 1 wherein said first set of particles has an average grain size less than about 1 micron, and said second set of particles has an average grain size no larger than about 15 microns.

3. The seal member of claim 2 wherein said first set of particles has an average grain size of about 0.5 micron, and said second set of particles has an average grain size of about 3 microns.

4. The seal member of claim 1 further comprising [about 91 wt. % to about 99 wt. % silicon carbide,] about 0.5 wt. % to 5.0 wt. % carbon, about 0.15 wt. % to about 3.0 wt. % boron, and up to about 1.0 wt. % additional carbon chemically associated with the boron.

5. The seal member of claim 4 further comprising about 0.5 wt % to about 4 wt % carbon, about 0.2 wt % to about 0.4 wt % boron as boron carbide, and about 0.05 wt % to about 0.11 wt % additional carbon chemically associated with the boron carbide.

6. The seal member of claim 5 further comprising about 98 wt % to about 99 wt % silicon carbide, about 1 wt % to about 1.5 wt % carbon, about 0.25 wt % to about 0.36 wt % boron, and about 0.07 wt % to about 0.10 wt % additional carbon chemically associated with the boron carbide.

7. The seal member of claim 1 wherein said silicon carbide is alpha silicon carbide substantially free of beta silicon carbide.

8. The seal member of claim 1 having a porosity between about 5 vol % and about 13 vol %.

9. The seal member of claim 8 having a porosity of about 8 vol %.

10. The seal member of claim 1 wherein the weight ratio of said first set of silicon carbide particles to said second set of silicon carbide particles is about 50/50.

* * * * *